United States Patent

Ichiyoshi

[11] Patent Number: 5,991,280
[45] Date of Patent: Nov. 23, 1999

[54] METHOD AND SYSTEM FOR CONTROLLING TDMA TIMING IN SATELLITE COMMUNICATION NETWORK

[75] Inventor: Osamu Ichiyoshi, Tokyo, Japan

[73] Assignee: NEC Corporation, Tokyo, Japan

[21] Appl. No.: 08/764,252

[22] Filed: Dec. 12, 1996

[30] Foreign Application Priority Data

Dec. 13, 1995 [JP] Japan ................................ 7-323404

[51] Int. Cl.⁶ .................................................. H04B 7/19
[52] U.S. Cl. ...................... 370/321; 370/324; 370/347; 370/350; 370/503; 370/337; 455/13.2; 713/400
[58] Field of Search .................................. 370/321, 324, 370/310, 345, 247, 350, 503, 328, 329, 336, 337; 455/12.1, 13.2, 502; 375/356; 342/356, 125; 395/551, 552, 559; 1/1; 713/400, 401, 601, 502, 503

[56] References Cited

U.S. PATENT DOCUMENTS

| | | | |
|---|---|---|---|
| 3,953,856 | 4/1976 | Hammack | 342/125 X |
| 4,028,497 | 6/1977 | Saburi | 370/321 |
| 5,619,507 | 4/1997 | Tsuda | 370/350 |
| 5,742,639 | 4/1998 | Fasulo II et al. | 455/12.1 X |
| 5,781,540 | 7/1998 | Malcolm et al. | 370/321 |
| 5,790,939 | 8/1998 | Malcolm et al. | 455/13.2 |
| 5,867,489 | 2/1999 | Hershey et al. | 370/324 |
| 5,878,034 | 3/1999 | Hershey et al. | 370/321 |

FOREIGN PATENT DOCUMENTS 5167485  7/1993  Japan .

*Primary Examiner*—Michael Horabik
*Assistant Examiner*—William H. Wilson, Jr.
*Attorney, Agent, or Firm*—Whitham, Curtis & Whitham

[57] ABSTRACT

A TDMA timing control method and apparatus for use in a TDMA satellite communication network synchronizes land earth stations in a global beam system and even in a multi beam system having generally no return channel. A land earth station of the satellite network generates a transmission timing thereof on the basis of its own time base and detects a receiving time of a signal from another land earth station. Times of the land earth stations are synchronized by exchanging the information of their own transmission timing and the receiving times of the signals with other land earth stations through control bursts, calculating time errors of their own time bases by solving simultaneous equations including time errors of the time bases of the other land earth station and propagation times to the satellite as unknown quantities and correcting the times of the time bases on the basis of the time errors.

11 Claims, 8 Drawing Sheets

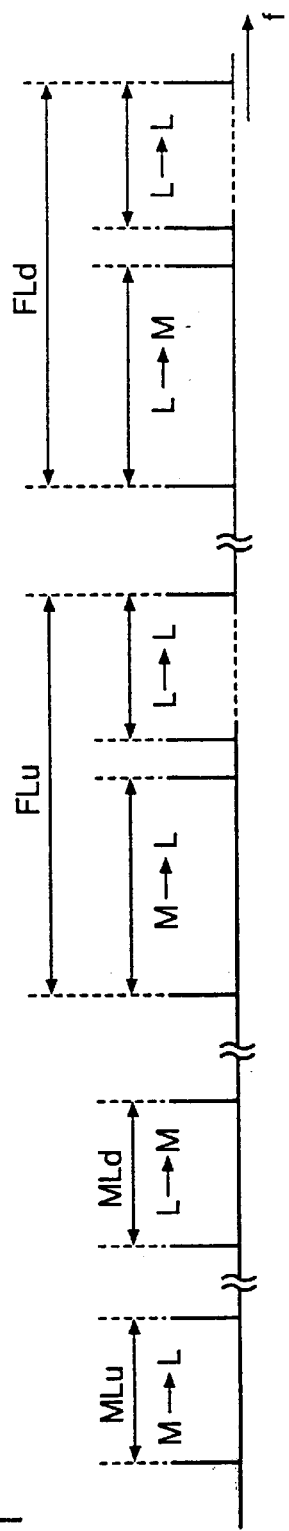
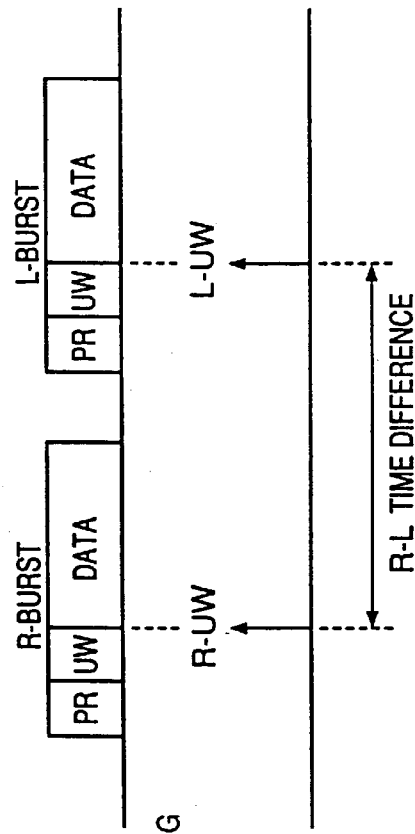
Fig. 2A FREQUENCY ASSIGNMENT PRIOR ART
Fig. 2B TDMA SIGNAL PRIOR ART
Fig. 2C UW DETECTION TIMING PRIOR ART

METHOD AND SYSTEM FOR CONTROLLING TDMA TIMING IN SATELLITE COMMUNICATION NETWORK

BACKGROUND OF THE INVENTION

1. Field of the Invention

The present invention relates to a method and system for controlling TDMA (Time Division Multiple Access) timing in a satellite communication network and, particularly, to a satellite communication network in which a plurality of land earth stations and a number of terminal earth stations are connected through a satellite system.

2. Description of the Related Art

A satellite communication system has been known in which a plurality of land earth stations (LES's) are connected through a communication satellite having a plurality of electric communication wave beams (referred to as merely "beams", hereinafter) to a number of terminal earth stations (TES's) to provide communication channels between the LES's and the TES's. As an example of the satellite communication system, a mobile satellite communication system for performing communication services for mobile terminals will be described.

FIG. 1 is a schematic block diagram of the mobile satellite communication system, in which there are a number of TES's 3 for each of a plurality of beam areas 4, which can be covered by one beam. A mobile link 6 constructed with a plurality of beams is formed between each beam area 4 and a communication satellite 1.

A plurality of LES's 2 are further provided and each LES 2 and a public switched telephone network (PSTN) 8 are connected to each other through a gate way 230. A feeder link (land earth station channel) constructed with a plurality of beams is provided between each LES 2 and the communication satellite 1.

The communication satellite 1 includes an antenna 101 for the feeder link 7, a duplexer (DPX) 102, a low noise amplifier (LNA) 103, a divider (DIV) 104, a frequency converter (F/C) 105, a traffic channel divider (TCD) 108, a baseband switch (BS) 109, a traffic channel Combiner (TCC) 110, a beam former (BF) 114 and a beam antenna 115.

A forward link is formed by these components and a return link is formed by a return TCD 113, a return BS 112, a return TCC 111, a return combiner 107 and a high power amplifier (HPA) 106.

FIG. 2(A) schematically shows a frequency assignment in the satellite communication system shown in FIG. 1. There are frequencies for the feeder link (FL) 7 and frequencies for the mobile link (ML) 6. The frequency for the feeder link 7 is divided to an uplink frequency FLu and a downlink frequency FLd and the frequency for the mobile link (ML) is divided to an uplink frequency MLu and a downlink frequency MLd.

The communication satellite 1 functions as a repeater for converting the uplink frequency FLu to the downlink frequency MLd in the forward communication channel and converting the uplink frequency MLu to the downlink frequency FLd in the return communication channel.

Since, in the mobile satellite communication, the antenna gain and the transmission power in the land earth station are severely limited, it is necessary to compensate for the limitation in antenna gain and transmission power by increasing the antenna gain and the transmission power in the communication satellite. In order to achieve the compensation, it is usual for the communication satellite to use an antenna having a radius as large as possible and to use a mobile link which utilizes a multi-beam covering a wider area.

Although the feeder link usually uses a single beam, it is effective to miniaturize the land earth station to use a multi-beam instead of the single beam.

In a signal multiplexing system, the time division multiple access (TDMA) system such as shown in FIG. 2(B) has been used mainly for the reasons that the DPX of the terminal station becomes unnecessary and that a control channel during communication can be monitored easily. Since, in the TDMA system, burst signals from a plurality of different stations are transmitted through a single frequency channel, it is necessary, in order to avoid collision between the burst signals, to control the transmission timing in the respective transmission stations.

In order to establish the burst signal synchronization for the TDMA system, a circuit shown in FIG. 3 which is of the global beam system has been used in each land earth station. The global beam circuits each shown in FIG. 3 of respective land earth stations can receive signals transmitted by themselves.

The circuit shown in FIG. 3 includes a land earth station antenna 211, a duplexer (DPX) 212, a high power amplifier (HPA) 213, an up-converter (U/C) 214, a modulator 215, a reference oscillator 222, a demodulator 227, a down-converter (D/C) 228 and a low noise amplifier (LNA) 229.

The circuit further includes a baseband processor (RX) 231, a timing error detector 232, a transmission timing generator 233 and a transmission burst generator 234.

The principle of the burst synchronization is simple. That is, as shown in FIGS. 2(B) and 2(C), each land earth station receives a TDMA signal including a burst signal transmitted by itself from a communication satellite, measures a time difference between a reference burst transmitted by the reference station and the burst signal transmitted by itself and detects the timing error on the basis of a deviation the time difference from its nominal setting value. Then, an output timing of the transmission timing generator 233 is controlled such that the timing error is corrected.

Such burst synchronizing method is known as the closed loop control method. This method can easily establish the synchronization by the simplest negative feedback control, although the correction frequency is limited in a delay time in two ways between the communication satellite and the land earth station. In the above-mentioned method, however, it is clear that it is effective in the case of a global beam system in which the land earth station can receive a signal transmitted by itself.

Incidentally, PR, UW and DATA shown in FIGS. 2(B) and 2(C) represent a preamble portion, a unique word for synchronization and data, respectively.

In a case where the feeder link which is a transmission channel of land earth stations uses multi beam, the respective land earth stations can not always receive burst signals transmitted by themselves and the closed loop control system can not be applied thereto. In such case, means for synchronizing contents of timers of the respective land earth stations becomes necessary.

As an example of such means, a system shown in FIG. 4 is proposed in Japanese Patent Application Laid-open No. Hei 5(1993)-167485. In FIG. 4, reference numerals 41 denotes an antenna, 42 a transceiver circuit, 43 a variable reference clock generator, 44 a D/A converter, 45a~45c interfaces, 46 a CPU (arithmetic operation circuit), 47 a GPS antenna, 48 a GPS receiver and 49 a counter.

The system shown in FIG. 4 intends to establish a time synchronization by means of the global positioning system (GPS) receiver which is separate from a satellite communication system, in which a signal from a GPS satellite under control of the U.S. Department of Defense is received through the GPS antenna 47 and the GPS receiver 48, obtains an absolute time from the received signal and controls a frequency of a reference clock A of the reference clock generator 43 according to the absolute time.

As described, the closed loop control method cannot be applied to the usual multi-beam satellite system but to the global beam system for the reason that the measurement of time error is impossible in the multi beam system since a land earth station can not receive a burst signal transmitted by itself.

Further, in the method shown in FIG. 4 in which the GPS system is used, the possibility of using the system is uncertain for the reason that there may be a case where use of the GPS system becomes difficult abruptly when any international trouble including the U.S.A. occurs since the GPS system itself is under control of the U.S. Department of Defense.

SUMMARY OF THE INVENTION

An object of the present invention is to provide a method and system for controlling TDMA timing in a satellite communication network, by which a synchronization can be established within a satellite system without depending on any external system such as the GPS system.

Another object of the present invention is to provide a method and system for controlling TDMA timing in a satellite communication network, which can function for not only the global beam system but also the usual multi-beam system.

According to the present invention, a communication channel is provided between a plurality of land earth stations and a plurality of land terminal stations. A communication signal between the respective land earth stations is constructed such that a plurality of communication signals are multiplexed in preliminarily given time slots by the time division multiple access system. Each of the land earth stations includes timer means capable of being corrected by a time error signal supplied externally, transmission timing control means for determining and controlling a transmission timing of a transmission burst signal such that the transmission burst signal arrives at a communication satellite within the time slot controlled by a preliminarily determined time given by the timer means, receiving means for receiving and reproducing burst signals from other land earth stations, timing detection means for detecting receiving timings of the received burst signals by means of the timer means, transmission means for transmitting an information of the detected receiving timings by multiplexing them on a burst signal of the land earth station to feedback the information to the other land earth stations, calculation means for calculating a time error on the basis of a receiving timing information of the burst signal of the land earth station contained in the burst signal received and reproduced by receiving means of other land earth stations at the latter stations by using simultaneous equations including the time error of the timer means and a propagation time up to the communication satellite as unknown quantities and time correction means for correcting a time to the time of the timer means on the basis of the time error.

BRIEF DESCRIPTION OF THE DRAWINGS

FIG. 2(A) is a diagram showing a frequency assignment in the network shown in FIG. 1;

FIG. 2(B) is a diagram for explaining a TDMA signal;

FIG. 2(C) is a diagram for explaining a UW detection timing;

DETAILED DESCRIPTION OF PREFERRED EMBODIMENTS

A TDMA timing control system and a method therefor according to the present invention will be described first. In each land earth station, a transmission timing of a burst signal transmitted by the land earth station is determined on the basis of a time of a timer or time base generator of the land earth station and receiving timings of the same burst signal at other land earth stations are detected. Further, the land earth station calculates a time error in the same station and time errors in other land earth stations by exchanging with the other land earth stations an information of the transmission timing of the land earth station and an information of receiving timings of the other land earth stations by means of control burst signals between the stations, providing simultaneous equations having time errors of time base generators of the respective land earth stations and a propagation time up to a communication satellite as unknown quantities and solving the equations.

Times of all of the land earth stations concerned are synchronized by correcting times of the time base generators of these stations on the basis of the calculated time errors.

An embodiment of the present invention will be described in detail with reference to the accompanying drawings.

Figure 3:
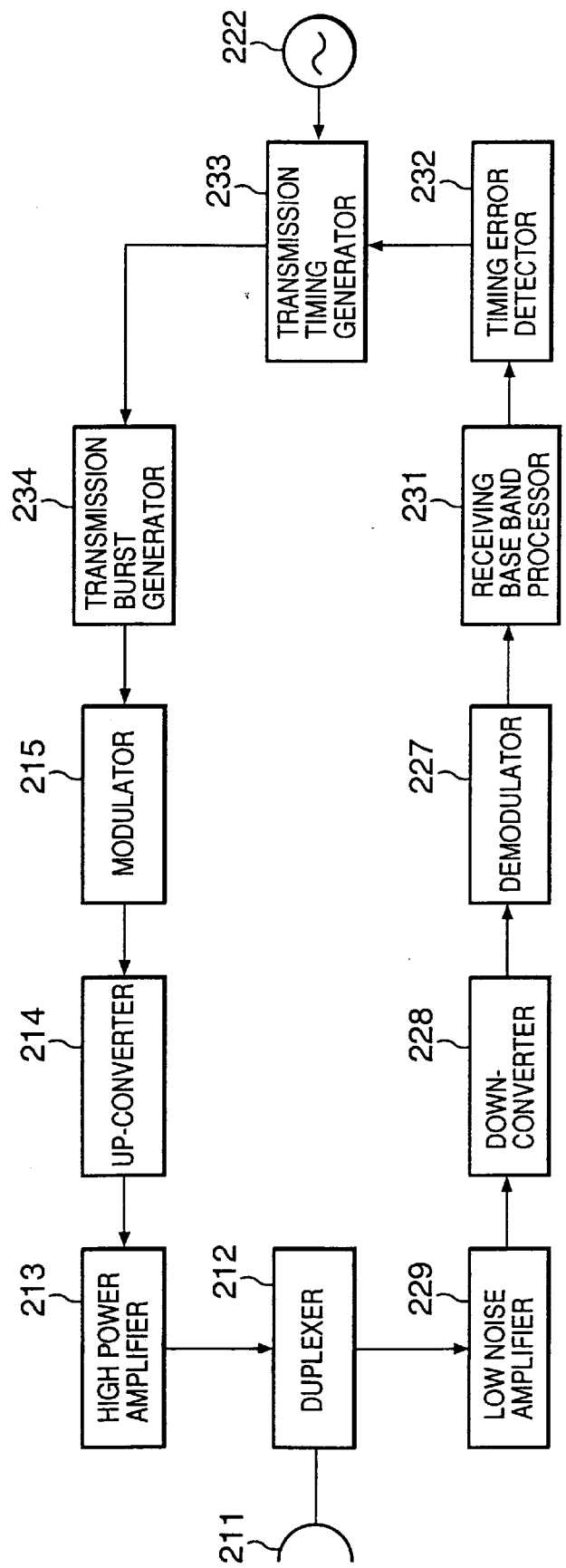
FIG. 3 is a block diagram showing a construction of a land earth station shown in FIG. 1.
Figure 4:
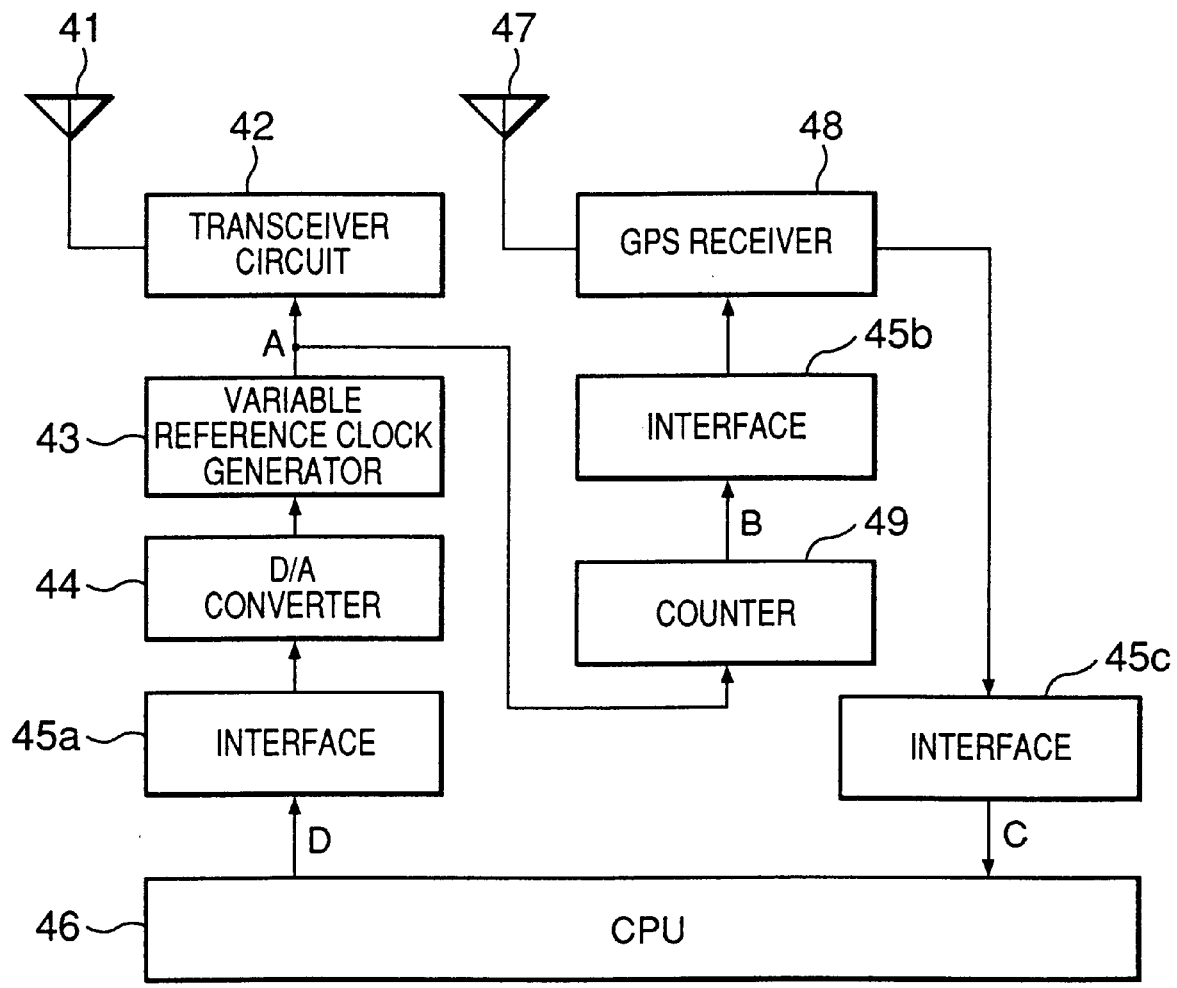
FIG. 4 is a block diagram showing a construction of another land earth station shown in FIG. 1 which uses a GPS receiver.
Figure 5:
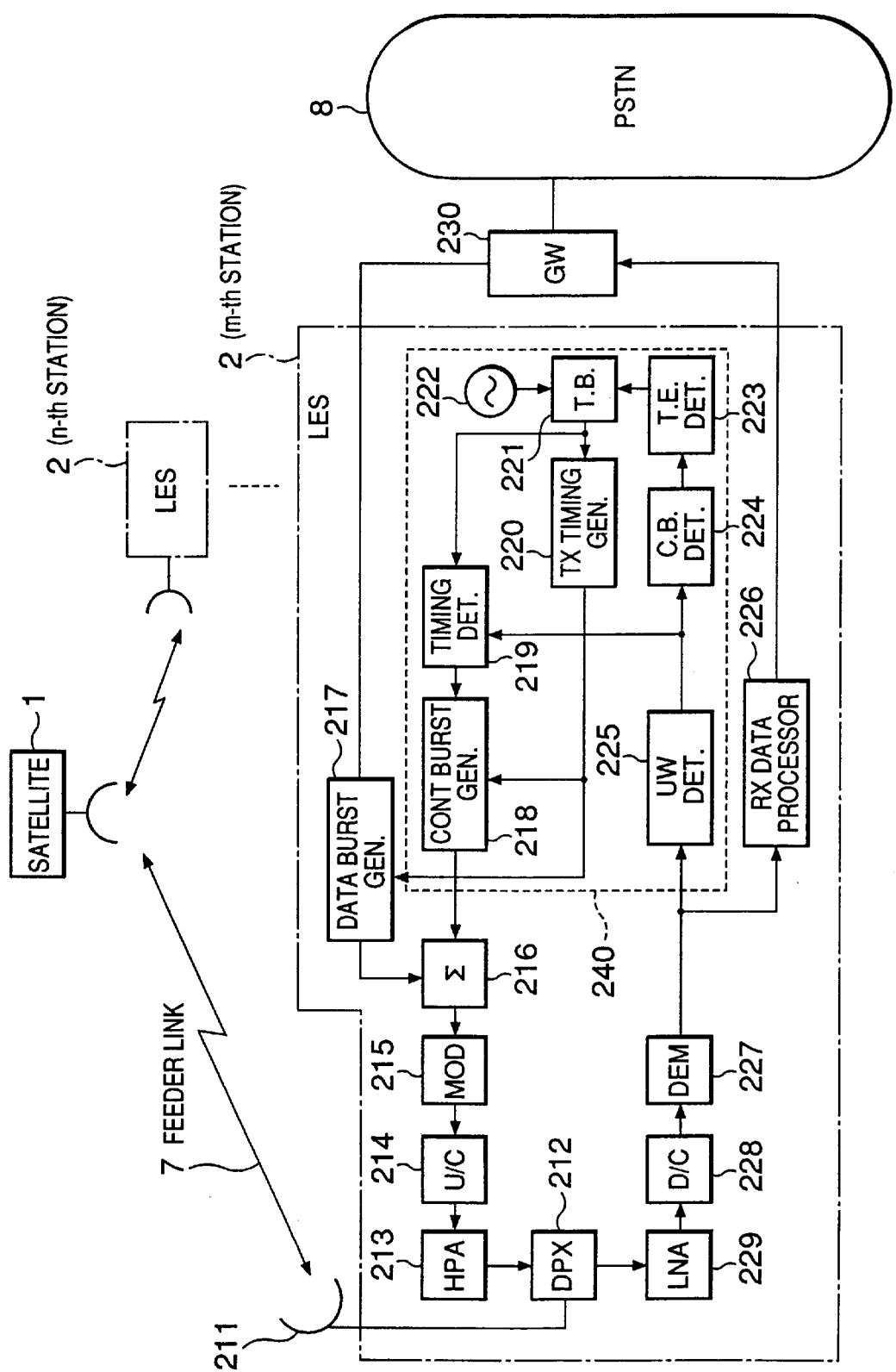
FIG. 5 is a block diagram showing a construction of a satellite communication network according to the present invention.

FIG. 5 is a block diagram of a land earth station (LES) 2 according to the embodiment of the present invention in which same or similar components thereof to those shown in FIG. 3 are denoted by same reference numerals, respectively. Totally N of such land earth stations are provided in the network where N is a natural number not smaller than 3. In FIG. 5, 216 denotes a signal combiner, 217 a data burst generator, 218 a control burst generator, 219 a burst receiving time detector, 220 a transmission timing generator, 221 a timer or time base generator and 222 a reference oscillator.

A reference numeral 226 denotes a receiving data processor, 225 a fixed pattern or unique word (UW) detector, 224 a control burst processor and 223 a time base error detector/controller.

Figure 1:
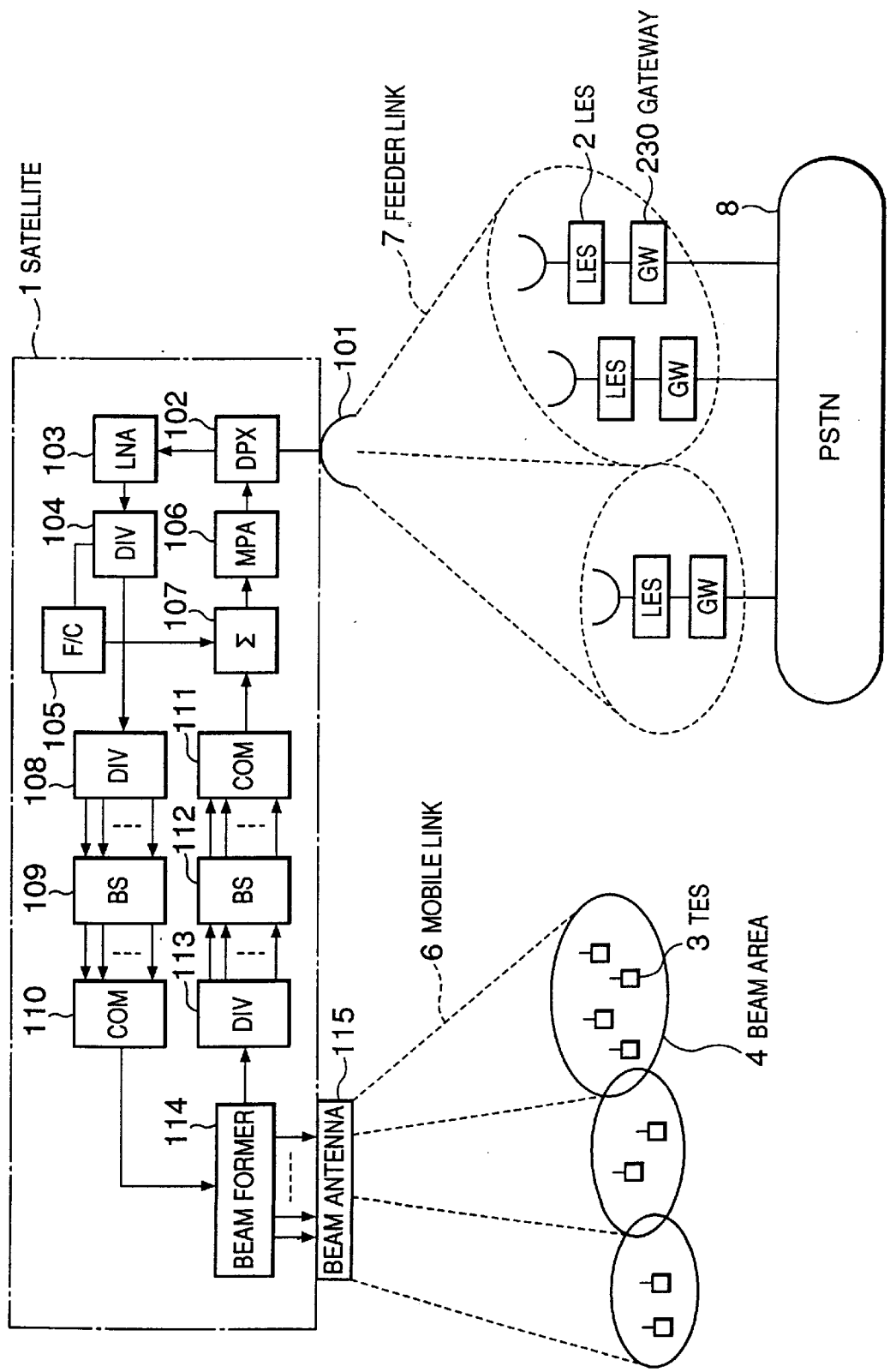
FIG. 1 is a block diagram showing a conventional mobile satellite communication network.

This land earth station 2 is connected to a public switched telephone network (PSTN) 8 through a gate way 230 as a gate station and communicates with all of other land earth stations through a communication satellite 1 in such a manner as shown in FIG. 1.

At least one of the N land earth stations is used as a reference earth station which generates a reference time for the TDMA timing.

Each land earth station 2 includes a transmission data burst generator 217 connected to the gate way 230 and a receiving data burst processor 226 which constitutes a communication channel together with the transmission data burst generator 217. Further, the unique word detector 225, the control burst processor 224, the time error detector/controller 223, the reference oscillator 222, the time base 221, the transmission timing generator 220, the burst receiving time detector 219 and the control burst generator 218 of the land earth station 2 constitute a control circuit 240. The control circuit 240 of a certain land earth station, for example, the m-th land earth station, exchanges various data to be used to establish the synchronization with the control circuit 240 of another land earth station, for example, the n-th land earth station. The data to be sent from the n-th land earth station through the satellite 1 to the m-th land earth station may contain a time $T_m$ of a time slot in the satellite assigned to the n-th land earth station, a delay time $D_m$ of the up link from the m-th land earth station to the satellite 1, etc. The delay time $D_m$ is preliminarily estimated and it is necessary to ultimately obtain an absolute delay time $d_m$. On the other hand, the data to be sent from the m-th land earth station through the satellite 1 to the n-th land earth station may contain a receiving detection timing $\tau[n/m]$ of a burst from the n-th land earth station at the m-th land earth station, etc. Incidentally, the symbol [n/m] indicates a case where a signal transmitted from the m-th land earth station is received by the n-th land earth station and a symbol [m/n] indicates a case where a signal transmitted by the n-th land earth station is received by the m-th land earth station.

Figure 6:
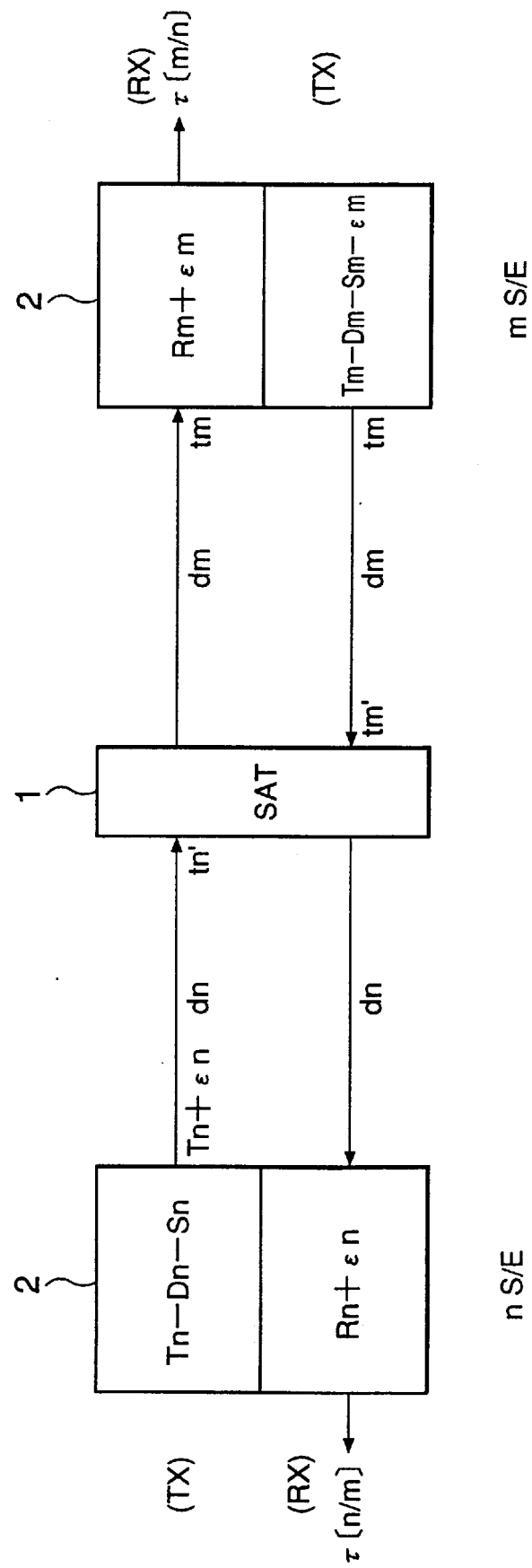
FIG. 6 is a diagram for explaining the timing at respective portions of n-th land earth station and m-th land earth station.
Figure 7:
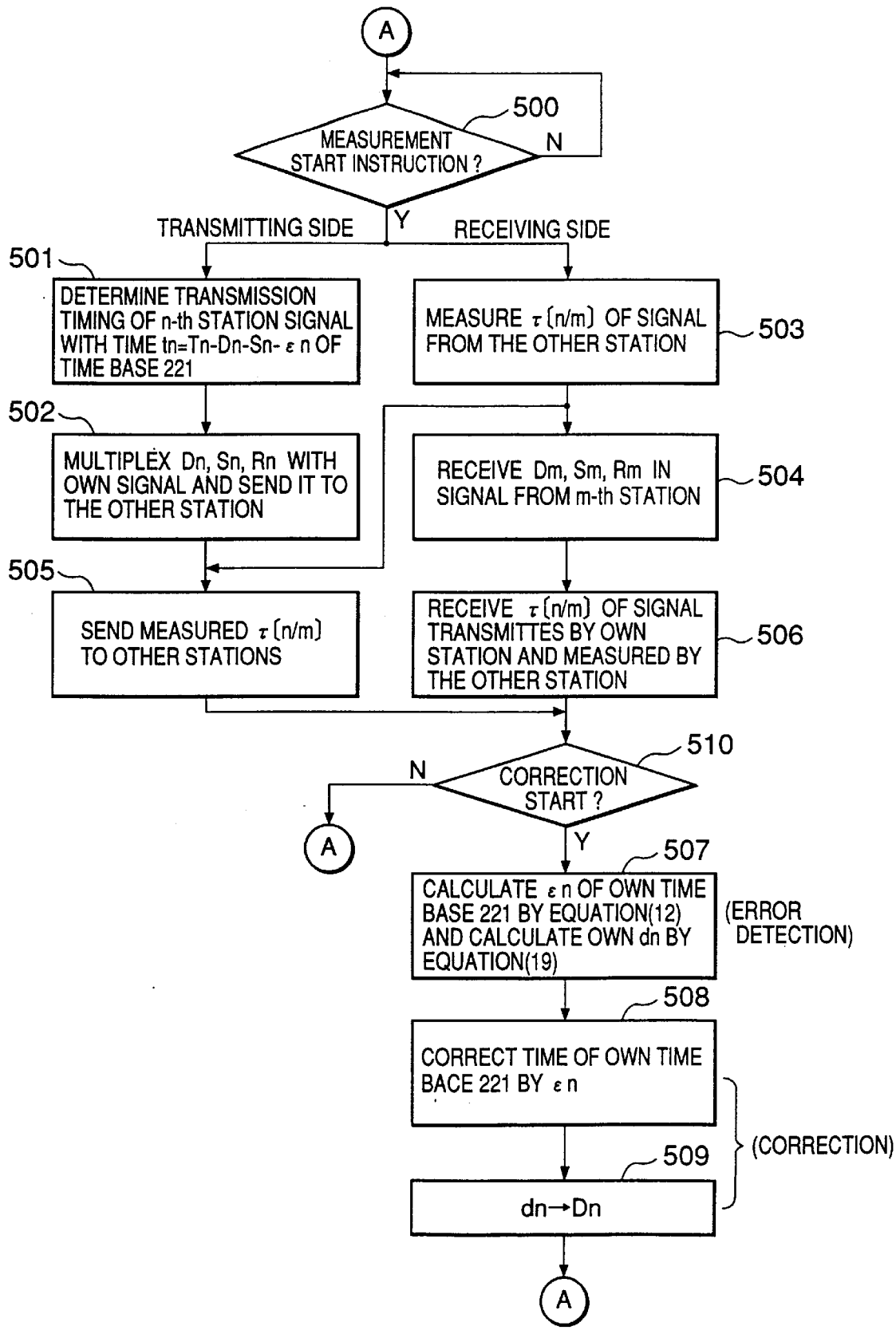
FIG. 7 is a flowchart of a timing control processing between the n-th land earth station and the m-th land earth station.

FIG. 6 shows a time relation when the n-th land earth station is opposing to the m-th land earth station through the satellite 1. An operation of this system will be described with reference to FIG. 6 and a flowchart of an operation of the n-th land earth station shown in FIG. 7.

A time instance obtained by counting an output of the reference oscillator 222 of the n-th land earth station by the time base 221 thereof is represented by $\tau_n$. Assuming a time error from an actual time instance t as $\epsilon_n$, the following equation is obtained:

$$\tau_n = t + \epsilon_n \quad (1)$$

In the n-th land earth station, in response to a synchronization measurement start instruction (step 500), a transmission burst timing $t_n$ is determined in the time base 221 (step 501). The time instance $t_n$ corresponds to a time instance $T_n$ at which a signal arrives at the satellite subtracted by a sum of the delay time $D_n$ up to the satellite and a delay time $S_n$ in the transmitter of the n-th land earth station. Since the value of $t_n$ contains the time error $\epsilon_n$, the following equation is established:

$$t_n = T_n - D_n - S_n - \epsilon_n \quad (2)$$

In this case, it is assumed that data of $S_n$, $D_n$ and $R_n$ which is a delay time in the receiving circuit of the n-th land earth station are inserted into its own control burst data and sent to the other land earth station (step 502).

This transmission burst signal arrives at the satellite at a time instance $t_n'$ which is represented by $$t_n' = t_n + d_n \quad (3)$$

since the burst signal is delayed by the estimated delay time $D_m$. In the equation (3), $d_n$ is an absolute signal propagation delay time measured from the n-th land earth station to the satellite and has an unknown value.

On the other hand, the receiving side receives the receiving signal from the m-th land earth station and measures the receiving timing $\tau[n/m]$ (step 503).

The receiving timing $\tau[n/m]$ is notified to other land earth stations (505). Then, the receiving side receives $D_m$, $S_m$ and $R_m$ inserted into the control burst from the m-th land earth station (step 504).

The receiving side receives a receiving timing information $\tau[m/n]$ of the signal transmitted by the receiving side itself, which is inserted into the control burst from the m-th land earth station (step 506).

That is, $\tau[m/n]$ means a time instance which is the time instance $t_n'$ on the satellite added by an absolute signal delay time $d_m$ from the satellite to the m-th land earth station, a delay time $R_m$ of the receiving circuit of the m-th land earth station and a time error $\epsilon_m$ from the actual time and represented by the following equation:

$$\tau[m/n] = t_n + d_n + d_m + R_m + \epsilon_m \quad (4)$$

Similarly, the receiving time instance $\tau[n/m]$ in the n-th land earth station is represented by the following equation:

$$\tau[n/m] = t_m + d_m + d_n + R_n + \epsilon_n \quad (5)$$

As described above, this measuring operation is repeated until the correction start instruction (step 510).

When the correction start instruction is issued, the following correction operations are started (steps 507, 508 and 509).

By inserting the equation (2) into the equation (4), the following equation is obtained:

$$\epsilon_m - \epsilon_n + d_n + d_m = \tau[m/n] - (T_n - D_n - S_n + R_m) \quad (6)$$

Further, by inserting the following equation:

$$t_m = T_m - D_m - S_m - \epsilon_m \quad (7)$$

into the equation (5), the following equation is obtained:

$$\epsilon_n - \epsilon_m + d_m + d_n = \tau[n/m] - (T_m - D_m - S_m + R_n) \quad (8)$$

where n, m=1, 2, . . . , N. The equations (6) and (8) are simultaneous linear equations including 2N of $\{\epsilon_n\}$ and 2N of $\{d_n\}$ as unknown values. Since $S_n$ and $R_m$ can be actually measured preliminarily, they have known values. Therefore, by solving the simultaneous linear equations, it is possible to obtain $\epsilon_n$ and $d_n$.

In this case, by subtracting the equation (8) from the equation (6) to remove $d_n + d_m$, the following equation is obtained:

$$\epsilon_m - \epsilon_n = \{T[m/n] - T[n/m]\}/2 \quad (9)$$

where $$T[m/n] = \tau[m/n] - (T_n - D_n - S_n + R_m) \quad (10)$$

$$T[m/n] = \tau[n/m] - (T_m - D_m - S_m + R_n) \quad (11)$$

It is assumed here that one of the land earth stations which provides a reference time is used as a base station having the number r. Thus, when the n-th land earth station is the base station r, $\epsilon_r = 0$. Therefore, the equation (9) is rewritten as follow:

$$\epsilon_m = \{T[m/r] - T[m/n]\}/2 \quad (12)$$

where m=1, 2, ..., N.

Thus, it is possible to calculate $\epsilon_m$. Since the time errors of the respective land earth stations are obtained (step 508), it is possible to synchronize the time bases of the respective land earth stations.

In the above description, the equations (10) to (12) are solved for the case of usual multi beam system. For a case of the global beam system, n and m in the equation (6) are in a relation n=m. In such case, the system is constructed such that a land earth station receives a burst transmitted by itself. Therefore, $$\epsilon_m = \epsilon_n \quad (13)$$

$$d_n = d_m \quad (14)$$

Thus, the relations of the equations (13) and (14) are inserted into the equation (6), with $d_n$ in this case being represented by $d_n^*$. As a result, it is possible to directly obtain the absolute propagation time by $$d_n^* = T[n/n]/2 \quad (15)$$

Similarly, for the m-th land earth station, $$d_m^* = T[m/m]/2 \quad (16)$$

The data of the equations (15) and (16) are used in a mutual communication between the n-th and m-th land earth stations. Therefore, in the case of the global beam, the following equation (17) is obtained from the equations (6) and (10):

$$\epsilon_m - \epsilon_n = T[m/n] - (d_n^* + d_m^*) \quad (17)$$

where n, m=1, 2, ..., N.

That is, the measurement related to differences of time errors between the respective land earth stations are performed and, thus, assuming the specific station n=r and $\epsilon_r=0$, the following equation is obtained:

$$\epsilon_m = T[m/r] - (d_m^* + d_r^*) \quad (18)$$

with which the time errors of the respective land earth stations can be detected. Therefore, it becomes possible to synchronize the time bases of the respective land earth stations by controlling the time bases 221 such that $\epsilon_m$ becomes 0 (step 508).

Figure 8:
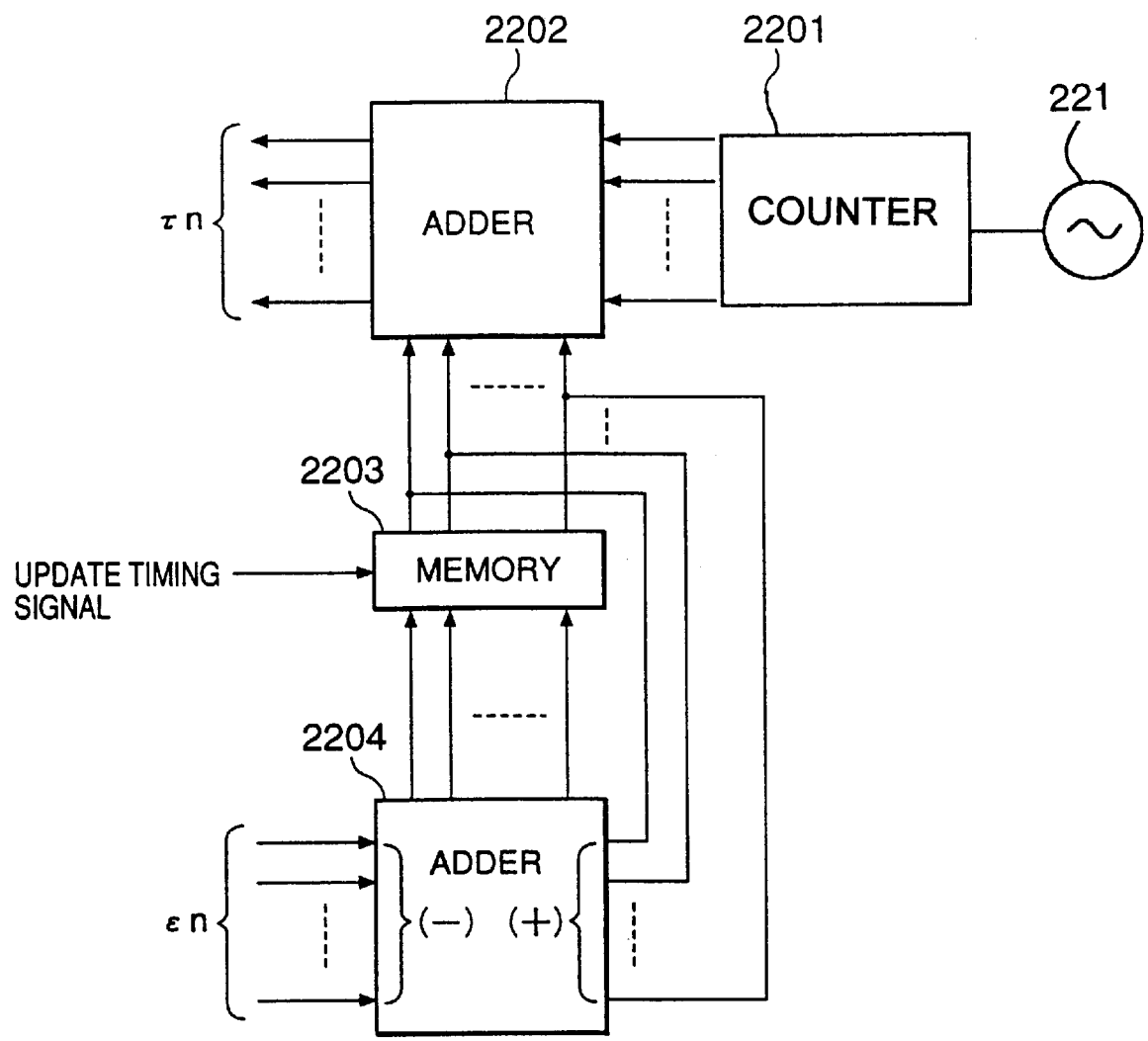
FIG. 8 is a diagram showing a practical construction of a time base 221 in a control circuit 240.

FIG. 8 shows a circuit construction for synchronizing the time bases by using the thus obtained time errors. In FIG. 8, a reference numeral 2201 denotes a free running counter, 2202 and 2204 are adders and 2203 is a memory. The time base of each land earth station generates a time signal by adding a correction value supplied from the memory 2203 to an output of the self running counter 2201 by the adder 2202.

The correction value has to be updated by the time error calculated through the method mentioned previously. That is, the content of the memory 2203 is updated according to an update timing signal from the time error detector/controller 223 by calculating a difference between a time error from the time error detector/controller 223 and previous correction value by the adder 2204.

Further, the equations (6) and (8) are added to each other, resulting in the following equation:

$$d_n + d_m = \{T[m/n] + T[n/m]\}/2 \quad (19)$$

The equation (18) includes N unknown values and N(N−1)/2 equations. Therefore, if N is 3 or more and N land earth stations exchange information with each other and the simultaneous linear equations are solved, the true absolute propagation delay $d_n$ from the respective land earth stations up to the satellite is obtained (step 507).

By using the thus obtained $d_n$ as the propagation time $D_n$ (step 509), the output bursts of the respective land earth stations can arrive at the satellite within the assigned time slot and thus it becomes possible to synchronize the bursts.

In a case where N=2, there are 2 unknown values and one equation. Therefore, it is impossible to obtain $d_1$ and $d_2$. In such case, however, the burst synchronization is unnecessary since a signal of the land earth station 1 (or 2) arrives at only the other land earth station 2 (or 1).

The above-mentioned processing (steps 501 to 510 in FIG. 7) is performed in all of the land earth stations at a constant interval, for example, at 1 second including a measuring time of 0.5 seconds and a correction time of 0.5 seconds. As a result, in a communication system using a low orbit communication satellite, that is, a communication system in which $d_n$ changes every moment, a correct synchronization becomes always possible.

On the basis of the timing information of the time bases of the respective land earth stations thus synchronized and the propagation time information up to the satellite, a communication to a terminal land earth station in a beam area which is different from the communication from a land earth station to another land earth station can be performed by the TDMA system.

As described hereinbefore, according to the present invention, the timing control becomes possible on the basis of time errors of the time bases of the respective land earth stations which are calculated by notifying the information of the transmission timings of the TDMA bursts and the detection/receiving timings of the respective land earth stations, etc., to each other and operating them. Therefore, the respective land earth stations can be synchronized within the satellite communication system without dependency on the external system such as GPS system, etc.

Further, since the propagation time up to the satellite can be obtained by synchronizing the respective land earth stations, it is possible to establish the burst synchronization and perform the TDMA communication in not only the global beam satellite communication system but also the multi beam satellite communication system.

What is claimed is:

1. A time division multiple access timing control system for use in a satellite communication network in which a plurality of land earth stations communicate with each other through a time division multiple access communication system, wherein said plurality of land earth stations includes a first land earth station which comprises:

determination means for determining a transmission timing on a basis of a time base of said first land earth station;

means for transmitting a signal to at least a second land earth station;

means for transmitting data of said first land earth station to at least said second land earth station;

detection means for detecting receiving timing information indicative of when said second land earth station received said signal transmitted from said first land earth station and for receiving data of said second land earth station;

exchange means for exchanging with said second land earth station information of the transmission timing of said first land earth station and receiving timing information of when said first land earth station received a signal transmitted from said second land earth station; and correction means for correcting a time of said time base of said first land earth station on a basis of the receiving timing information detected by said detection means.

2. A time division multiple access control system as claimed in claim 1, wherein said correction means functions to solve simultaneous equations including a time error of said time base and a propagation time measured from said first land earth station to said satellite as an unknown value.

3. A time division multiple access control system as claimed in claim 1, wherein the transmission timing and the receiving timing information exchanged by said exchange means are transmitted by control burst signals.

4. A time division multiple access control system as claimed in claim 1, wherein said data contains a delay time from said first land earth station to said satellite, a delay time generated in a transmission from said first land earth station and a delay time generated in a receiving in said first land earth station.

5. A time division multiple access control system as claimed in claim 1, wherein at least one of said plurality of land earth stations functions as a base station of the time division multiple access timing.

6. A time division multiple access control system as claimed in claim 1, wherein said satellite communication network is applicable to a satellite communication network using a global beam or a multi beam.

7. A time division multiple access control system as claimed in claim 1, wherein said plurality of land earth stations are connected to each other through a public switched telephone network and a gate way as a gate station.

8. A time division multiple access timing control device in a satellite communication network which provides a communication channel between a plurality of land earth stations and in which communication signals between respective said land earth stations are multiplexed within preliminarily given time slots according to a time division multiplexing system, wherein each said land earth station comprises:

timer means capable of being corrected by a time error signal supplied externally;

transmission timing control means for determining and controlling a transmission timing of a transmission burst signal such that the transmission burst signal arrives at a communication satellite within a time slot controlled by a preliminarily determined time given by the timer means;

receiving means for receiving and reproducing burst signals from other land earth stations;

timing detection means for detecting receiving timings of the received burst signals by said timer means;

transmission means for transmitting an information of the detected receiving timings by multiplexing them on a burst signal of said land earth station to feedback the information to said other land earth stations;

calculation means for calculating a time error on the basis of a receiving timing information of the burst signal of said land earth station contained in the burst signal received and reproduced by said receiving means of said other land earth stations at the latter stations by using simultaneous equations including the time error of said timer means and a propagation time up to said communication satellite as unknown quantities; and time correction means for correcting a time to the time of said timer means on the basis of a time error.

9. A time division multiple access timing control circuit as claimed in claim 8, wherein said calculation means calculates the propagation time by solving said simultaneous equation.

10. A time division multiple access timing control device as claimed in claim 8, wherein said transmission timing control means determines the transmission timing of the transmission burst signal on a basis of a time instance corrected by said time correction means and the propagation delay time.

11. A time division multiple access timing control method in a satellite communication network for performing a communication between land earth stations according to a time division multiple access communication system, the method comprising the steps of:

determining, in a first land earth station, a transmission timing of said first land earth station on a basis of a time base of said first land earth station;

transmitting, from said first land earth station, a signal including the thus determined transmission timing of said first land earth station to at least a second land earth station;

detecting, in said first land earth station, receiving timing information indicative of when said second land earth station received said signal transmitted from said first land earth station;

detecting, in said first land earth station, data of at least said second land earth station from the receiving signals;

exchanging with at least said second land earth station information including the transmission timing of said first land earth station and receiving timing information of when said first land earth station received a signal transmitted from said second land earth station; and correcting the time of said time base of said each land earth station on a basis of the receiving timing information detected by said first land earth station in the first detecting step.

* * * * *